United States Patent Office 3,231,623
Patented Jan. 25, 1966

3,231,623
PROPYNYL THIOETHER
Walter Reifschneider, Midland, and Jacqueline S. Kelyman, Auburn, Mich., assignors to The Dow Chemical Company, Midland, Mich., a corporation of Delaware
No Drawing. Filed June 17, 1963, Ser. No. 288,508
5 Claims. (Cl. 260—609)

This application is a continuation-in-part of application Serial Number 205,520, filed June 27, 1962, and now abandoned.

The present invention is directed to thioethers and in particular is directed to the novel thioether corresponding to the formula

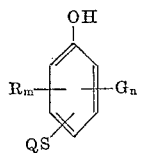

wherein R is lower alkyl, $m$ is an integer from 0 to 3, both inclusive, G is halo or nitro, $n$ is an integer from 0 to 3, both inclusive, and Q is an alkynyl radical of from 3 to 10, both inclusive, carbon atoms, the sum of $m$ and $n$ being not more than 4.

The novel compounds are colorless to yellow liquid somewhat more viscous than water: or crystalline solids. They are slightly soluble in water and readily soluble in various common organic solvents such as lower alkanols, benzene, and the like. The compounds are useful as pesticides; as inhibitors of the germination of fungus spores, they are effective fungistats. They are germicides. They are also useful as intermediates in the preparation of biologically active materials such as organic phosphorous compounds. By employment of the unsaturation in the alkynyl group, they can be polymerized to obtain viscous materials useful as bodying agents in greases, or resinous solids.

The compounds are prepared in various ways of which three are preferred. The first is a process which comprises the step of causing a reaction between a mercaptophenol compound corresponding to the formula

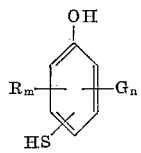

or the alkali metal or cuprous salts thereof, and a halide of the formula

QX wherein X represents halo, all the other symbols having the values previously stated. During the reaction to prepare compounds, halogen reacts at the site of the aromatic thiol. Thus, the alkynylthio radical of choice can be introduced by choice of alkynyl halide. For efficiency, the starting reactants should be employed in equimolecular proportions, or preferably, with mercaptophenol in slight excess. However, other proportions may be employed, if desired, and unconsumed starting material of whatever identity may, if desired, be recycled into further synthesis process.

The reaction goes forward at temperatures over a wide range such as 0° to 200° C., but initiates most readily when heated to a temperature somewhat higher than room temperature, preferably 40° to 100° C.; under these conditions the reaction is, in general, exothermic and goes forward to completion with good yield calculated upon the basis of consumed starting material. Hydrogen halide of reaction is evolved when mercaptophenol is employed, and means for its orderly disposal are advantageously provided. A hydrogen halide acceptor such as sodium hydroxide or triethylamine is satisfactory.

In carrying out the present reaction to prepare the compounds of the present invention, the mercaptophenol and a chosen halo compound are intimately mixed and blended with halide acceptor, if employed, and, if it is desired to carry the preparation to completion promptly, the mixture thereafter heated to a temperature at which reaction takes place promptly. In one convenient manner of practicing the present method, mercaptan is caused to react by heating the reaction mixture to a reaction temperature; the reaction temperature may be the reflux temperature of the liquid reaction medium. In this situation, heating may be continued at the boiling temperature of the reaction mixture and under reflux for a period of time to carry the reaction to completion.

Not all the compounds of the present invention can be prepared to best advantage in the foregoing method, because not all the mercaptans are economically available, although the method is often preferred for convenience. The compounds of the present invention, including those which cannot be prepared efficiently in the foregoing method can all be prepared, conveniently and in good yield, by either of the two following second and third methods, which are preferred for this versatility.

In the second method of preparation of compounds of the present invention, a hydroxy alkylthiophenyl thiocyanate of the formula

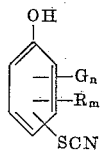

is caused to react with an alcohol of the formula

QOH in the presence of a base. In the general formulae of the present method, the symbols G, $n$, R, $m$ and Q have the values hereinbefore defined. In the present process, the alcohol and (thiocyanato)phenol compound react together in equimolecular amounts, but the reaction is favored by the employment of excess alcohol. Moreover, when such alcohol is of appropriate identity, it may be employed in excess as a liquid reaction medium. On the other hand, if desired, such alcohol may be employed in an amount less than that equimolecular with the (thiocyanato)phenol compound, and therefore in a limiting amount. In carrying out the method, the alcohol and (thiocyanato)phenol compound, dissolved together in further portions of alcohol or in an inert liquid reaction medium which may be tetrahydrofuran or a dialkyl ether, are added in a slow stream to a solvent solution of base. The solvent employed to dissolve the base should desirably be of the same identity as that employed also as reactant and solvent in the other solution or should be an inert liquid reaction medium such as a dialkyl ether, tetrahydrofuran or the like. Desirably but not necessarily it should be of volatility distinctly different from that of the product. The base to be employed can be an alkali metal alkoxide, an alkali metal hydroxide, a tertiary amine or other strongly basic amine or the like. Desirably, an amount equivalent to 1 to 3 times the molecular proportion of (thiocyanato)phenol of the said base should be present in the solution thereof.

Upon the completion of the combining of the reactants, the resulting reaction mixture is heated at a reaction temperature, typically between room temperature and 150° C., preferably between about 40° and 100° C. for a period of time such as from about 5 minutes to about 100 hours, and typically from about 20 minutes to about 6 hours to carry the reaction to a desired degree of completion. Product is formed in at least small amounts immediately upon the contacting together of all the components of the reaction mixture. However, especially at lower temperatures, yields obtained tend to be quite low after only short reaction periods. When yield more nearly quantitative is desired, heating should be employed or an extended reaction time, preferably with stirring, should be provided.

When the reaction has gone forward to the desired degree, typically to the exhaustion of a limiting reactant, excess liquid reaction medium can be removed by, for example, vaporization under atmospheric or subatmospheric pressure, and the resulting product residue permitted spontaneously to cool to room temperature. The resulting residue may then be poured into a mixture of ice and concentrated hydrochloric acid whereby to neutralize any excess of basic material and to permit, typically, separation of product as a solid of very low solubility in water. From this point forward, routine purification procedures applicable in all the syntheses of the present compounds can be employed.

In a third process for the preparation of any of the products of the present invention, a hydroxy phenyl thiocyanate of the formula

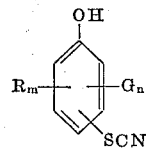

is caused to react with a halocarbon compound of the formula

wherein X represents halogen, and each other symbol has the value hereinbefore defined. The reaction goes forward in the presence of a base, and desirably in an inert liquid reaction medium. Tetrahydrofuran, a dialkyl ether, or preferably an alcohol or water, liquid reaction medium may be employed. The reaction goes forward smoothly, obtains good yields, and employs starting materials efficiently. It goes forward at a good rate at room temperature, usually reaching completion in from about 2 to about 4 hours, depending upon quantities of reactants employed, temperature, whether stirring is employed and other factors. At lower temperature, times of up to 200 hours may be desired to obtain maximum yield, whereas at reflux temperature of solvent, typically a temperature between 50 and 150° C., much shorter times, such as 20 minutes to an hour or 2 hours give good results. Some of the desired product is formed immediately upon the contacting together of the reactants and when small yield of product in the presence of relatively large amounts of unconsumed starting material is satisfactory, very short reaction times can be employed and the resulting reaction mixture employed in crude form shortly after the initiation of the reaction to obtain at least minimum benefits according to the present invention. When it is desired to obtain product in maximum yield, the reaction is permitted to go forward to a desired degree of completion or to its natural termination point which is usually the exhaustion of a limiting reactant, and a crude reaction mixture thereof substantially employed. When it is desired to obtain products in highly purified form, the reaction mixture is warmed under atmospheric or subatmospheric pressure, to vaporize and remove liquid reaction medium and the resulting product-containing residue is purified in routine manners which apply alike to all the methods of synthesis by which the present products are advantageously prepared.

Upon completion of the reaction in any of the syntheses, the compound product of the present invention can be purified in any of various manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms in which the desired product is a solvent-soluble fraction. Representative solvents include diethyl ether, chlorinated hydrocarbons, and benzene. The said precipitate is extracted with solvent, the solvent extract dried over an inert drying agent such as, for example, anhydrous sodium sulfate or the like; the solvent vaporized and removed and the remaining product chilled or otherwise induced to crystallize and, if desired, recrystallized from a solvent such as benzene, lower aliphatic hydrocarbons, methylcyclohexane, or a lower alkanol. In another manner, the reaction mixture is fractionally distilled to vaporize and remove solvent and, in a relatively narrow boiling range, product.

When production of the present compound is to be carried out on an industrial scale, various other methods of separation and purification may be preferred, including, for example, centrifugation, decantation, vacuum distillation, and the like.

The following examples, without more, will enable those skilled in the art to practice the present invention:

*Example 1.—o-(2-propynylthio)phenol*

A reaction mixture is prepared, consisting of 12.6 grams (0.1 mole) of o-mercaptophenol, and 4.0 grams of sodium hydroxide dissolved in 50 milliliters methanol. To this, there is added, dropwise and with vigorous stirring, 11.9 grams (0.1 mole) of 3-bromopropyne-2. The resulting reaction mixture is placed in a flask under reflux, and heated at its reflux temperature (a pot temperature between approximately 50° and 75° C.) for 2 hours to carry the reaction to completion. At the end of this reaction period, the resulting hot mixture is filtered; the sodium chloride residue is discarded. The filtrate is warmed to vaporize and remove solvent and obtain a residual oil. This oil is dissolved in 50 milliliters 10 percent aqueous sodium hydroxide: the resulting solution is washed with ether and poured into ice and 15 milliliters concentrated hydrochloric acid. An oily phase which separates is recovered and distilled under declining subatmospheric pressure and at gradually rising temperatures. As a result of these procedures there is obtained an o-(2-propynylthio)-phenol product as a colorless, oily liquid boiling at 75° C. under pressure of 3 millimeters mercury, absolute; and having a refractive index $n/D$ of 1.5979 at 25° C.

The compound of the present example is useful as a parasiticide and insecticide. The application of a water dispersion containing 500 parts of the said compound as sole toxicant per million parts of resulting aqueous dispersion to a population of two-spotted spider mites resulted in an almost complete kill of the mites.

Other compounds of the present invention are similarly prepared.

From 4-mercapto-2-butylphenol and propargyl iodide, a 2-butyl-4-(2-propynylthio)phenol.

From 3-bromopropyne and 4-mercapto-m-cresol, a 4-(2-propynylthio)-m-cresol boiling at 132°–133° C., under 0.6 millimeter mercury pressure, absolute.

From 1-bromodecyne-2 and 4-mercapto-3,5-xylenol, a 4-(2-decynylthio)-3,5-xylenol product.

From 3-bromopropyne and 4-mercapto-3,5-xylenol, a 4-(2-propynylthio)-3,5-xylenol, melting at 64.5°–65.5° C.

*Example 2.—p-(2-propynylthio)phenol*

A first reactant mixture is prepared consisting of 151 grams 4-hydroxyphenyl thiocyanate and 120 grams 3-bromopropyne dispersed in a half liter ethanol. A second reactant mixture is prepared consisting of 120 grams sodium hydroxide in a half liter water.

The said first and second liquid reactant mixtures are slowly mixed together with stirring, and the resulting reaction mixture placed in suitable apparatus and heated under reflux for two hours, to carry the reaction to completion. At the end of two hours reaction time, the resulting reaction mixture is cooled to approximately room temperature, and poured into a mixture of ice and concentrated hydrochloric acid. Ice melts, and excess alkaline substances are neutralized, and there forms in the resulting aqueous solution an immiscible liquid product layer. This layer is removed in a separatory funnel; the aqueous layer is extracted twice with 200 milliliter portions of ether; the ether extracts are combined with the liquid product and the resulting solution is dried over anhydrous sodium sulfate, and fractionally distilled to obtain a p-(2-propynylthio)phenol product as a pale yellow liquid boiling at 113° to 114° C. under a pressure of 0.3 to 0.4 millimeter mercury absolute, and having a refractive index $n/D$ at 25° C. of 1.6144. The saturated aqueous solution of the compound, of concentration less than 1 percent of present compound by weight of solution is germicidal.

*Example 3*

In procedures essentially the same as those of Example 2, wherein the starting phenol compound is 5-chloro-2-ethyl-4-hydroxyphenyl thiocyanate, and with 1-chloro-1-hexyne (boiling at 47° C. under 55 millimeters mercury) there is obtained a 2-chloro-5-ethyl-4-(1-hexynylthio)-phenol as a white crystalline solid.

Also, employing 2-(3,3-dimethylbutyl)-4-hydroxy-5-iodo phenol thiocyanate and 1-decyne-3-ol, and with triethylamine, there is obtained a 5-(3,3-dimethylbutyl)-4-(1-heptyl-2-propynylthio)-2-iodophenol product.

Also, from 3-bromopropyne and 3,5-dinitro-4-hydroxyphenyl thiocyanate in the presence of sodium hydroxide or in water there is obtained a 2,6-dinitro-4-(2-propynylthio)phenol as a yellow crystalline solid which should be handled with care and preferably in small quantities.

We claim:
1. Compound of the formula

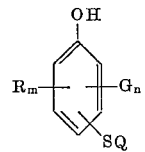

wherein R represents lower alkyl, $m$ is an integer from 0 to 3, both inclusive, G is a member of the group consisting of halo and nitro, $n$ is an integer of from 0 to 3, both inclusive, Q is an alkynyl radical of from 3 to 10, both inclusive, carbon atoms, and the sum of $m$ and $n$ is an integer from 0 to 4, both inclusive.
2. o-(2-propynylthio)phenol.
3. p-(2-propynylthio)phenol.
4. 4-(2-propynylthio)-m-cresol.
5. 4-(2-propynylthio)-3,5-xylenol.

No references cited.

CHARLES B. PARKER, *Primary Examiner.*